Sept. 11, 1956
R. J. KELLER
2,762,737
METHOD OF MANUFACTURE OF EXPANDERS
FOR FLUID-OPERATED BRAKES
Original Filed Nov. 23, 1946
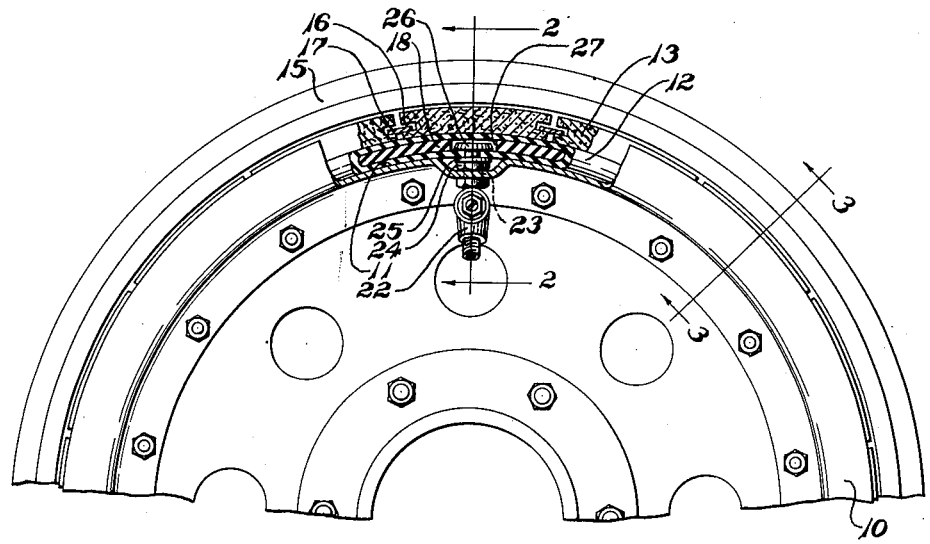
Fig-1
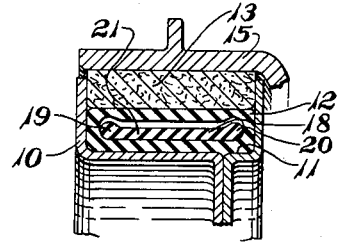
Fig-3
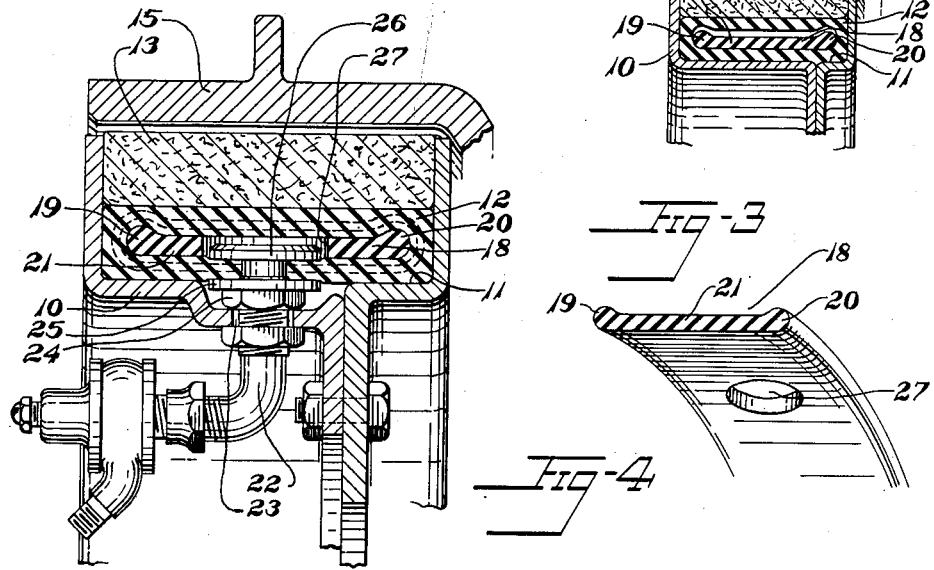
Fig-2
Fig-4
Inventor
Russell J. Keller
By Harold S. Meyer
Atty United States Patent Office 2,762,737
Patented Sept. 11, 1956

2,762,737

METHOD OF MANUFACTURE OF EXPANDERS FOR FLUID-OPERATED BRAKES

Russell J. Keller, Dayton, Ohio, assignor to The B. F. Goodrich Company, New York, N. Y., a corporation of New York Original application November 23, 1946, Serial No. 711,947, now Patent No. 2,612,909, dated October 7, 1952. Divided and this application June 28, 1952, Serial No. 296,213

5 Claims. (Cl. 154—85)

This invention relates to expanders for brakes, clutches and the like and to the manufacture thereof. This application is a division of my application Serial No. 711,947, filed November 23, 1946, now Patent No. 2,612,909 entitled "Expander and Method of Manufacture."

It is an object of the present invention to form an endless annular expander tube with a molded inner surface.

Other objects are to provide an expander tube having walls of uniform shape along the length thereof, to provide a tube with smoothly rounded cavity margins, to provide a tube having a minimum capacity for inflation fluid in its collapsed condition, to provide for improved flexing action at the margins of the tube cavity, to provide a core-molded cavity surface, and to provide for improved retention of the tube in its supporting channel.

These and objects will appear from the following description and the accompanying drawings.

Of the drawings,

Fig. 1 is a side elevation of an expander tube brake having a tube constructed in accordance with and embodying the invention, parts being broken away, Fig. 2 is a cross-section thereof on line 2—2 of Fig. 1, Fig. 3 is a cross-section thereof on line 3—3 of Fig. 1, and Fig. 4 is a perspective view of a portion of the mandrel or core.

Referring to the drawings, the numeral 10 designates a brake supporting drum formed with a channel for supporting an expander tube 12 and a set of brake shoes 13 in opposed relation to a reaction member 15. The brake shoes may be of molded material having a high coefficient of friction and heat resisting properties such as molded brake lining material. Each shoe is grooved as at 16 at its ends to engage over flat retractor springs 17 which may have their ends seated in the side walls of the brake channel for resisting torque.

The expander tube 12 has an annular core 18 in the form of a band having thickened beaded lateral margins 19, 20 separated by thinner portions 21 of uniform thickness. The core is preferably of stiff material such as hard or semi-hard rubber compound and is not adhered to the tube which surrounds it, at least in the radially outward portions. The tube 12 at its interior closely conforms to the core in shape and dimension in its deflated condition and is made of elastic resilient rubber or other rubber-like material. It has smoothly rounded lateral wall surfaces between which the outer peripheral surface is of reduced diameter. A valve stem 22 for connecting the expander tube to a source of fluid under pressure extends through an opening 23 in the floor of the channel 11 and is clamped about an opening in the tube as by a nut 24 and washer 25 at the outside face of the tube and a flange 26 at the inner face of the tube.

For clearing the flange 26 of the valve stem, an opening 27 is formed through the core 18. The arrangement is such that in the deflated position of the tube, the tube cavity is closed by contact of the tube with the core except for the clearance area about the flange 26 within the opening 27 providing a tube of minimum capacity in the deflated position shown in Fig. 2. In the inflated position shown in Fig. 3 the outer wall of the tube is separated from the core by the fluid pressure. A further advantage of this construction lies in the fact that no sharp flexure or creasing of the tube at the margins of the cavity is required to close the tube completely.

In constructing the expander tube the core 18 is molded and preferably at least partially vulcanized. The opening 27 may be formed therethrough by molding or may be formed by drilling or punching the finished core. Material is then wound about the core in sheet form and conformed to the surface of the core after which the core with the material thereabout may be vulcanized in a mold or in open steam as desired. The core acts to shape the inside of the tube to the desired shape and size in addition to serving its purposes in the completed tube.

In order to provide for high lift of the brake shoes without excessive stretch of the walls of the tube at its margins it is desirable to form the inflatable cavity with radially outwardly turned portions at the marginal walls. To provide against cracking of the tube under the stress of inflation it is also desirable to avoid sharp corners and to provide smoothly curved walls at the lateral margins of the cavity. These results are accomplished uniformly by provision of the core 18 which controls the molding of the cavity during manufacture, and thereafter acts to hold the tube in place against undesirable dislodgment, and to reduce the space for trapping inflating liquid due to displacement thereof without requiring sharp creasing of the tube wall.

Variations may be made without departing from the scope of the invention as it is defined by the following claims:

I claim:

1. The method of making an expander tube which comprises forming an endless annular core of stiff hard material resistant to adherance to rubber with beaded lateral margins having a smooth surface and an opening extending radially through a portion of the core intermediate said margins, enclosing said core in an annular fluid-retaining tube of unvulcanized rubber-like material which surrounds the core along its complete length and the interior of which tube conforms to the shape of said core, and vulcanizing said tube and securing a valve in communication with said opening in the band to a portion of the tube for introducing fluid into said tube.

2. The method of making a brake expander tube which comprises providing an endless annular solid ring-like core of rubber-like material treated to render the surface thereof resistant to adherence to rubber, folding a sheet of unvulcanized rubber-like material circumferentially around said core to form an endless annular fluid-distensible tube enclosing and snugly embracing said core along its complete length, and then vulcanizing the resulting assembly of said tube and said core to conform the interior surface of said tube to the shape of said core.

3. The method of making a brake expander tube which comprises forming an endless annular solid ring-like core of stiff rubber-like material with a smooth surface and smooth beaded circumferential edges, at least partially prevulcanizing the core to render the surface of the core resistant to adherence to rubber, folding a sheet of unvulcanized rubber-like material peripherally about said prevulcanized core snugly to form an endless annular fluid-distensible tube wholly enclosing said core along its complete length, and then vulcanizing the resulting assembly of said tube and core to conform the interior surface of said tube to the shape of said core.

4. The method of making a brake expander tube which comprises providing an endless core of a material resistant to adherence to rubber and having a smooth surface and smooth beaded circumferential edges, folding a sheet of unvulcanized rubber-like material longitudinally about said core along its complete length to wholly enclose said core within an endless fluid-distensible tube of unvulcanized rubber-like material, and then vulcanizing the resulting assembly of said tube and said core with the interior surface of said tube conforming to the shape of said core.

5. The method of making a brake expander tube which comprises forming an endless annular solid ring-like core of stiff rubber-like material with a smooth surface and smooth beaded circumferential edges, at least partially prevulcanizing the core to render the core resistant to adherence to rubber, forming an opening through said core, folding a sheet of unvulcanized rubber-like material peripherally about said core to form an endless annular fluid-distensible tube wholly enclosing said core along its complete length, assembling a valve with said tube in communication with the interior of said tube at said opening in the core and vulcanizing the resulting assembly of said tube and said core with the interior surface of said tube conforming to the shape of said core.

References Cited in the file of this patent

UNITED STATES PATENTS

| | | |
|---|---|---|
| 815,571 | Williams | Mar. 20, 1906 |
| 858,048 | Whitman | June 25, 1907 |
| 931,563 | Carbone | Aug. 17, 1909 |
| 1,559,702 | Hopkinson | Nov. 3, 1925 |
| 2,051,849 | Hanna | Aug. 25, 1936 |
| 2,308,484 | Auzin | Jan. 19, 1943 |